Patented Aug. 3, 1971

3,597,502
BF₃ COMPLEXES WITH PHOSPHONATES
Robert William McAda, Lake Jackson, Tex., assignor to
The Dow Chemical Company, Midland, Mich.
No Drawing. Filed Sept. 11, 1968, Ser. No. 759,235
Int. Cl. C07f 5/02; C07g 3/00; C08b 19/04
U.S. Cl. 260—922      3 Claims

ABSTRACT OF THE DISCLOSURE

New compounds of the general formula

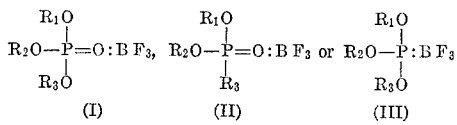

and the known compound

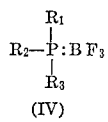

wherein $R_1$, $R_2$ and $R_3$ are each aryl, alkaryl, aralkyl, alkyl or haloalkyl of 1 to about 8 carbon atoms, are useful as new latent catalysts in the oxyalkylation reaction between a vicinal alkylene oxide and a hydroxy-containing organic compound.

BACKGROUND OF THE INVENTION

In the oxyalkylation reaction between a vicinal alkylene oxide and an organic hydroxy-containing compound it is common to use a catalyst to obtain the advantage of higher reaction rates at lower temperatures.

$BF_3$ and $BF_3$·etherate are well-known catalysts in such an oxyalkylation reaction. The inherent problems of temperature control and product discoloration resulting from the use of $BF_3$ or $BF_3$·etherate as catalyst in the oxyalkylation reaction are also well-known.

SUMMARY OF THE INVENTION

It has now been discovered that new compounds of the general formula

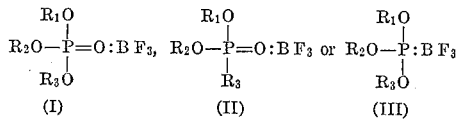

and the compound

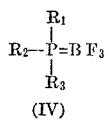

wherein $R_1$, $R_2$ and $R_3$ are each aryl, alkaryl, aralkyl, alkyl or haloalkyl of 1 to about 8 carbon atoms, are useful as new latent catalysts in the oxyalkylation reaction between a vicinal alkylene oxide and a hydroxy-containing organic compound.

The inventive compounds are surprisingly unreactive toward vicinal alkylene oxides, hydroxy-containing organic compounds, and mixtures of vicinal alkylene oxides and hydroxy-containing organic compounds at temperatures below about 120° C. However, at temperatures above about 120° C., the inventive compounds are effective catalysts in the oxyalkylation reaction between the above mentioned oxides and hydroxy-containing compounds, and, the oxyalkylation reaction is found to proceed smoothly without any violent exotherm by reacting by contacting the inventive catalysts, vicinal alkylene oxides and hydroxy-containing compounds at a temperature above about 120° C. Accordingly, the inventive compounds are advantageously mixed with at least one of the oxyalkylation reactants at a convenient temperature below about 120° C. Such a procedure insures a substantially even distribution of the catalyst throughout the reaction mixture which results in a more uniform product. Since the inventive compounds are mild catalysts, no violent exotherm is observed and the problems of temperature control are substantially reduced.

The inventive compounds are particularly valuable in catalyzing the oxyalkylation reaction between an alkylene oxide and a solid hydroxy-containing compound. The inventive compounds are most generally stable, low-viscosity liquids and therefore are easily blended into such solid hydroxy-containing compounds by simply stirring the catalyst and solid hydroxy-containing compound together, or the solid compound can be suspended in the liquid alkylene oxide, or an inert solvent, and the catalyst then evenly blended into the mixture with stirring.

Mixing a catalytic amount of the inventive compounds with at least one of the oxyalkylation reactants at a temperature below about 120° C. is a process improvement in the oxyalkylation reaction between a vicinal alkylene oxide and a hydroxy-containing organic compound.

The compounds of the invention are conveniently prepared by reacting by contacting a compound of the formula $$\begin{array}{cccc} R_1O & R_1O & R_1O & R_1 \\ | & | & | & | \\ R_2O-P=O, & R_2O-P=O, & R_2O-P & \text{or} & R_2-P \\ | & | & | & | \\ R_3O & R_2 & R_3O & R_3 \\ (I) & II & (III) & (IV) \end{array}$$

wherein $R_1$, $R_2$ and $R_3$ are each aryl, alkaryl, aralkyl, alkyl or haloalkyl of 1 to about 8 carbon atoms, with either $BF_3$ or $BF_3$·etherate at a temperature of between about 0° C. and about 120° C. This is conveniently done in either of two general procedures: (a) by bubbling gaseous $BF_3$ into the liquid phosphorus-containing compound or (b) by mixing substantially equimolar quantities of $BF_3$·etherate with the phosphorus-containing compound. If desired, the ether by-product resulting from the latter procedure may be removed by heating the mixture under reduced pressure.

It is desirable that no free $BF_3$ or $BF_3$·etherate be present in the product of the above reactions. Accordingly, at least equimolar quantities of the phosphorus-containing compound and $BF_3$ or $BF_3$·etherate are suitable in the above reactions and a molar excess of the phosphorus-containing component is preferred.

Examples of suitable phosphorus-containing compounds include: trimethyl-, triethyl-, tripropyl-, tributyl-, trihexyl-, tris(2-chloroethyl)-, tris(2-bromoethyl)-, tris(2,3-dibromopropyl)-, tris(para-t-butylphenyl)-, triphenyl-, dimethyl ethyl-, dipropyl methyl-, dibutyl ethyl-phosphate; diethyl ethylphosphonate, dibutyl butylphosphonate; trimethyl-, triethyl-, tributyl-, trihexyl-, tris(2-chloroethyl)-, tricresyl-, triisooctyl-, triisopropyl-, triphenyl-, dimethyl ethyl-, dipropyl hexylphosphite; tri-n-butylphosphine, triphenylphosphine, and other like compounds.

The oxyalkylation reactants, other than the inventive catalysts are well-known. For example, suitable vicinal alkylene oxides include ethylene oxide, propylene oxide, butylene oxide, epichlorohydrin, other like compounds and mixtures thereof.

The suitable hydroxy-containing organic compounds include the aliphatic and cycloaliphatic alcohols, glycols, polyols, phenols, carbohydrates, and other hydroxy-containing compounds. Examples include ethanol, butanol, n- octanol, 3-methyl-2-butanol, isopropanol, 5-propyl-3-hexanol, 2-chloroethanol, cyclohexanol, sorbitol, starch, cellulose, pentaerythritol and the class of compounds known as the saccharides, i.e. glucose, sucrose, lactose, etc., phenol, resorcinol, m-cresol, hydroquinone, p-chlorophenol, ethylene glycol, propylene glycol, glycerol, hexanetriol, alkanolamines, trimethylene glycol, pinacol, and other like hydroxy-containing compounds. Preferred species in this class of hydroxy-containing compounds are those wherein the hydroxyl is primary or secondary, and most preferably is secondary.

The oxyalkylation reaction conditions of temperature, pressure and ratio of reactants are likewise well-known.

SPECIFIC EMBODIMENTS

The following examples further illustrate the invention:

EXAMPLE 1

Catalyst preparation—$(CH_3O)_3P:BF_3$

To a vessel, which was in an ice-bath and had been purged with nitrogen, was charged 2.84 g. of $BF_3$·etherate. Then, 2.48 g. of trimethyl phosphite was added dropwise with stirring. After the addition was complete, the reaction mixture was removed from the bath and allowed to warm to about room temperature. A mild exotherm was observed which raised the temperature to about 40° C. during about a 30 min. interval. After the exotherm had subsided, the ethyl ether was removed under reduced pressure. There was recovered 3.85 g. of a straw-colored liquid product having the following analysis:

Actual (percent): P, 16.7; B, 5.5. Theory (percent): P, 16.15, B, 5.64.

Using substantially the procedure and molar ratio of reactants described in the example above, except the phosphorus-containing compound was varied, the following catalysts were prepared and analyzed:

Catalysts: Reactant
(6)  $[(CH_3)_2CHO]_3P:BF_3$ — $[(CH_3)_2CHO]P$
(7)  $(C_4H_9)P:BF_3$ — $(C_4H_9)_3P$
(8)  $(C_4H_9O)_2(C_2H_9)$
  $PO:BF_3$ — $(C_4H_9O)_2(C_4H_9)PO$
(9)  $(C_2H_5O)_2(C_2H)_5$
  $PO:BF_3$ — $(C_2H_5O)_2(C_2H_5)PO$
(10) $(C_6H_5)_3P:BF_3$ — $(C_6H_5)_3P$
(11) $(CH_3C_6H_4O)_3PO:BF_3$ — $(CH_3C_6H_4O)_3PO$
(12) $(C_6H_5O)_3PO:BF_3$ — $(C_6H_5O)_3PO$ It was found, by preparing catalysts 1, 2 and 3 according to both procedures above, that the catalyst composition is substantially the same whether the reaction temperature is about 0°–50° C. or about 100°–110° C. Accordingly, the compounds can be prepared at any convenient temperature between about 0°–120° C.

EXAMPLE 2

Reaction between sucrose and epichlorohydrin

The following tabulated results are based on experiments wherein 0.025 mole of the phosphorus-containing compound were mixed with 0.006 mole of $BF_3$·etherate and the mixture was then heated to 100–110° C. to insure complete reaction and drive off the ethyl ether. Run no. 6 differed from the above in that 0.030 mole of phosphorus-containing compound were used. In each experiment, the resulting catalytic complex was added at room temperature to 2.54 moles of epichlorohydrin (Epi), mixed, and allowed to stand for 15 min. Any temperature rise was noted during this time interval. Then 0.20 mole of sucrose was mixed in without any observable reaction. The reaction vessel was sealed and placed in a rotating steam autoclave at 130° C. for 16 hrs. After cooling, any volatile material remaining in the reaction mixture was removed under reduced pressure, and the residue weighed. In each case a brown viscous liquid was recovered and no trace of unreacted sucrose was present. The oxyalkylation reaction products were analyzed and the results reported as the number of moles of Epi per mole of sucrose. See Table I.

TABLE I

| Run | Phosphorus compound | (Grams) | Temperature rise (° C.) | Final recovered product (grams) | Epi reacted, mols per mol of sucrose |
|---|---|---|---|---|---|
| 1 | Tris(chloroethyl) phosphite | 6.6 | 1 | 232 | 8.6 |
| 2 | Trimethyl phosphite | 3.1 | 2 | 231 | 8.7 |
| 3 | Tributyl phosphite | 6.25 | 0 | 174 | 5.4 |
| 4 | Triisoprppyl phosphite | 5.2 | 0 | 186 | 6.1 |
| 5 | Tributyl phosphine | 5.1 | 0 | 280 | 11.8 |
| 6 | Triphenyl phosphine | 7.8 | 1 | 216 | 7.6 |
| 7 | Dibutyl butylphosphonate | 6.25 | 1 | 192 | 6.4 |
| 8 | Diethyl ethylphosphonate | 4.15 | 0 | 192 | 6.5 |
| 9 | None—control | | 80 | | |

NOTE.—Similar results are obtained by using the remaining catalysts, prepared in Example 1, in the procedure of Example 2.

| Catalyst | Product analysis, percent | | | |
|---|---|---|---|---|
| | P(a)[1] | P(t)[1] | B(a) | B(t) |
| 1. $(CH_3O)_3P:BF_3$ | 16.7 | 16.15 | 5.5 | 5.64 |
| 2. $(C_2H_5O)_3P:BF_3$ | 13.5 | 13.85 | 4.6 | 4.83 |
| 3. $(C_4H_9O)_3P:BF_3$ | 8.3 | 9.75 | 3.3 | 3.40 |
| 4. $(C_6H_5O)_3P:BF_3$ | 7.3 | 8.20 | 2.3 | 2.86 |
| 5. $(ClCH_2CH_2O)_3P:BF_3$ | 9.2 | 8.56 | 3.5 | 3.27 |

[1] (a)=Actual percentage; (t)=Theoretical percentage.

In a similar procedure, except that the reaction mixture was heated in a bath at about 100°–110° C. for 30 min. to insure complete reaction and to drive off the ethyl ether, the following catalysts were prepared:

EXAMPLE 3

Reaction between sucrose and other epoxides

Using substantially the procedure and molar ratio of reactants of Example 2, sucrose was reacted with (a) phenyl glycidyl ether and (b) propylene oxide in the presence of the catalyst $(ClCH_2CH_2O)_3P:BF_3$. In each instance a light brown viscous liquid was obtained. The catalyst was prepared by the procedure of Example 2.

EXAMPLE 4

Reaction between pentaerythritol and epichlorohydrin

Pentaerythritol (5 mols) was mixed with Epi (2.3 mols) in the presence of the catalyst $(ClCH_2CH_2O)_3P:BF_3$. The reaction mixture was heated for 18 hours at 110–120° C. under autogenous pressure. The mixture was then cooled and volatiles removed under reduced pressure. The product was a light yellow viscous liquid. The catalyst was prepared by the procedure of Example 2.

The inventive compounds are therefore seen to be effective latent catalysts in the oxyalkylation reaction between vicinal alkylene oxides and organic hydroxy-containing compounds.

I claim:
1. A compound having the formula

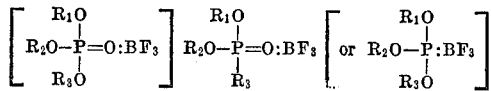

wherein $R_1$, $R_2$ and $R_3$ are each independently aryl, alkaryl, alkyl, cloroalkyl, or bromoalkyl of 1 to about 8 carbon atoms.

2. The compound defined in claim 1 wherein $R_1$, $R_2$ and $R_3$ are alkyl.

3. The compound defined in claim 2 wherein $R_1$, $R_2$ and $R_3$ are each methyl, ethyl, propyl, butyl.

References Cited

Heitsch et al.: "Chem. Abstract," vol. 58 (1964), p. 1067.

Frazer et al.: "Jou. Chem. Soc." (London), 1960, pp. 726–30.

Burg et al.: "Jou. Am. Chem. Soc.," vol. 73 (1951), pp. 4590–1.

CHARLES B. PARKER, Primary Examiner

A. H. SUTTO, Assistant Examiner

U.S. Cl. X.R.

260—209, 231, 233.3, 611, 613, 615

PO-1050
(5/69)

UNITED STATES PATENT OFFICE
CERTIFICATE OF CORRECTION

Patent No. 3,597,502          Dated  August 3, 1971

Inventor(s)  Robert William McAda

It is certified that error appears in the above-identified patent and that said Letters Patent are hereby corrected as shown below:

Column 1, line 53, cancel the formula and insert $$\begin{array}{c} R_1 \\ | \\ R_2\text{-P:BF}_3 \\ | \\ R_3 \end{array}$$

Column 5, Claim 1, line 2, delete the formulas and insert $$\begin{array}{c} R_1O \\ | \\ R_2O\text{-P=O:BF}_3 \\ | \\ R_3 \end{array}$$

Column 5, Claim 1, line 4, delete "cloroalkyl" and insert --chloroalkyl--.

Signed and sealed this 4th day of June 1974.

(SEAL)
Attest:

EDWARD M. FLETCHER, JR.
Attesting Officer

C. MARSHALL DANN
Commissioner of Patent